W. S. BATE.
Refrigerator Buildings.
No. 143,317. Patented September 30, 1873.
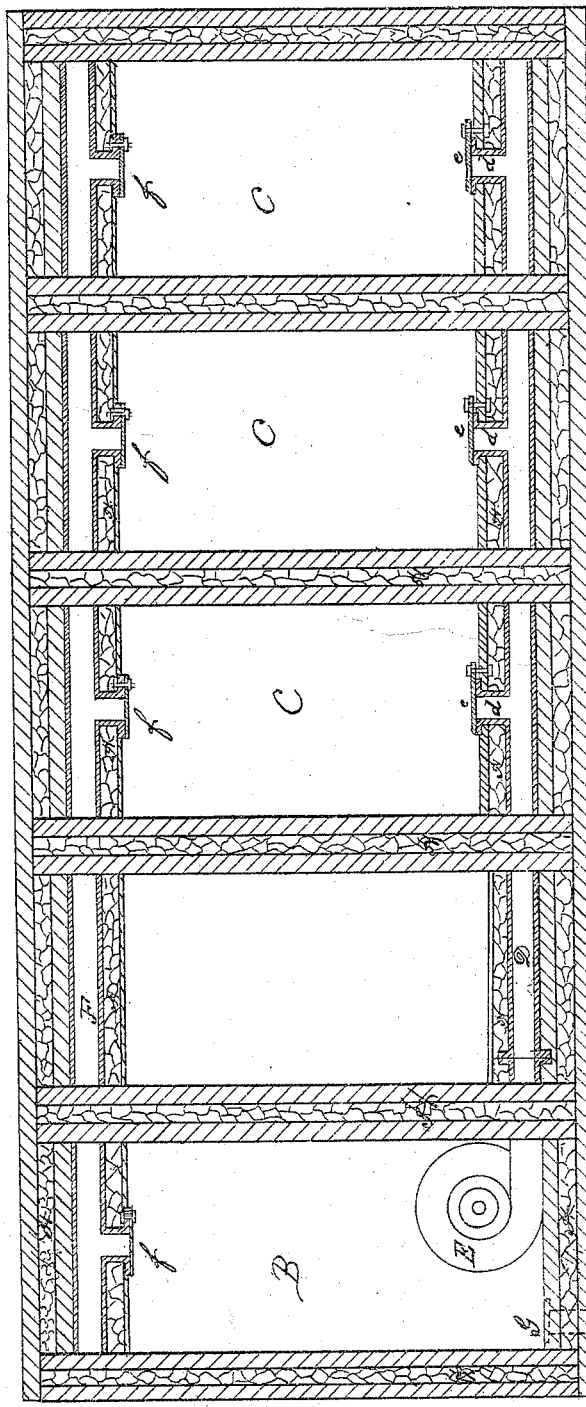

UNITED STATES PATENT OFFICE.

WILLIAM S. BATE, OF PHILADELPHIA, PENNSYLVANIA.

IMPROVEMENT IN REFRIGERATOR-BUILDINGS.

Specification forming part of Letters Patent No. 143,317, dated September 30, 1873; application filed June 24, 1873.

*To all whom it may concern:*

Be it known that I, WILLIAM S. BATE, of Philadelphia, in the county of Philadelphia and State of Pennsylvania, have invented certain new and useful Improvements in Warehouse Refrigerators; and I do hereby declare the following to be a full, clear, and exact description of the invention, such as will enable others skilled in the art to which it pertains to make and use it, reference being had to the accompanying drawings, which form part of this specification, and in which the figure shown is a representation of a vertical longitudinal section of my invention.

My invention has for its object to provide means for preserving fruits, vegetables, meat, and other perishable objects from decay. The nature of my invention consists in the method and means of refrigeration, as hereinafter fully described, having reference, first, to the combination, with a single ice-chamber, provided with a fan or blower, of a series of separate and independent preserving-apartments, communicating with said ice-chamber by induction and eduction pipes, through which the currents of cold air may be driven from the ice-chamber to, into, and through any one or more of said preserving-apartments, said currents entering at the lower portion or through the floor, and passing out through the upper portion, the inlets and outlets of said apartments being provided with valves, so that any one or more of them may be cut off from the circulation; secondly, to the combination, with a series of separate and independent preserving-apartments, through which the air has an upward circulation, produced by means of a fan or blower, of a single ice-chamber, arranged as hereinafter described, so that the air-currents from any one or more of said apartments will be forced into and through it in contact with its contents, for the purpose of purifying and drying said currents, in order that the air may be re-used.

Referring to the accompanying drawing, which illustrates my invention, A shows a warehouse or other suitable building, divided into various apartments, of which B is an ice-chamber, and C C C preserving-rooms. The ice-chamber may, if desirable, be located in the cellar or any other part of the building, or even in an adjacent house, and the preserving-rooms may be arranged in rows or stories. D represents a tube extending from the ice-chamber, and communicating, by short pipes *d d*, with the preserving-rooms. E is a fan, placed either in the ice-chamber or connected therewith by suitable means, for forcing the air through the tube D. F is a return flue or tube communicating with each of the preserving-rooms and ice-chamber, both this flue and the tube D, or the short pipes leading therefrom to the preserving-rooms, having suitable valves *e* and *f*, by which communication with said rooms may be cut off. G is a waste port or pipe for carrying off the water which flows from the ice in the chamber B, which pipe should be provided with a valve that, while it will permit the water to run off, will close to prevent the admission of air. The walls H of the preserving-rooms and ice-chamber should be packed with some suitable non-conducting material, as air-slaked lime.

The operation is as follows: A sufficient quantity of ice being placed in the chamber B, and the fruit or other articles requiring preservation being stored in the rooms C C, the doors by which access is had to said chamber and rooms are closed, the valves *e e* and *f f* opened, and the fan started, drawing the cold air from the bottom of the ice-chamber, forcing it through the tube D into the chambers C C, where it is diffused, cooling the articles placed therein, and carrying off the noxious vapors or gases, returning through the tube F to the ice-chamber. Here the air, which returns in a somewhat heated and impure condition, is purified, and its moisture condensed, the impurities passing off with the water, while the pure, dry atmosphere, at a reduced temperature, is again returned to the chambers C C, thus making a complete revolution from the ice-chamber to the preserving-rooms, and from the latter back again to the former.

Should any of the preserving-rooms be empty, communication therewith may be cut off, and the air made to pass through those only which contain stores.

The advantage of the above-described means of preservation may be briefly stated as follows: One ice or cooling chamber may be made to serve for any number of preserving-rooms, and hence economy of ice is secured. It will also, obviously, be more easy to replenish a single chamber with ice than to supply several apartments separately with the same article, which would be necessary if each of the preserving-rooms contained the cooling material or had a separate cooling-room of its own. Another advantage is, that the supply of ice may be proportioned to the quantity of material stored, so that, if only one preserving-room contains stores, but a small quantity of ice will be required; whereas, if all the stores were in one room, whether the quantity were great or small, the supply of ice, in order to keep the whole room cool, must be the same. A still further advantage is, that by closing the proper valves for that purpose access may be had to the ice-chamber or any of the preserving-rooms without disturbing the others. Again, by creating the revolution above mentioned, the air is not permitted to remain stationary or stagnant at any point, but is constantly kept in motion, whereby the vaporous or gaseous impurities are carried from the preserving-rooms to the ice-chamber, and there thrown off or discharged, only the dried and purified atmosphere being forced into the preserving-rooms. By this means the air first contained in the ice-chamber and preserving-rooms may be used again and again, without the admission of fresh air, which would be more of a detriment than an advantage.

The arrangements herein described may with advantage be applied to ships, boats, and cars, as well as to stationary warehouses, and wherever applied the advantages above mentioned will exist—the preservation of an even temperature throughout, economy of ice, facility of storage and removal, and the prevention, as well, of the contamination of one article by another, which would occur if a sensitive article like milk were placed in the same apartment with some substance or store having an offensive odor.

What I claim as my invention is—

1. In combination with a series of separate and independent preserving-apartments, two or more, and a single ice-chamber for cooling the same, induction and eduction pipes and a fan or blower, arranged substantially as described, so that a current of cold air may be driven from the said ice-chamber to, into, and through any one or more of said chambers, said current entering at the lower portion or through the floor and passing out through the upper part or ceiling, and returning to the ice-chamber to be used again, the outlets and inlets of said chambers having valves so arranged that any one or more of them may be cut off from the circulation, substantially as specified.

2. In combination with a series of separate and independent preserving-apartments, through which an upward movement of air is produced by means of a fan or blower, a single ice-chamber, arranged substantially as described, so that the air-currents from any one or more of said apartments will be forced into and through it in contact with its contents for the purpose of purifying and drying said current, substantially as specified.

In testimony that I claim the foregoing I have hereunto set my hand this 16th day of June, 1873.

WILLIAM S. BATE.

Witnesses:
JOHN RODGERS,
M. DANL. CONNOLLY.